United States Patent
Liu et al.

(10) Patent No.: US 8,562,082 B2
(45) Date of Patent: Oct. 22, 2013

(54) FIXING MECHANISM OF HOUSING AND FIXING ASSEMBLY THEREOF

(75) Inventors: Chih-Li Liu, New Taipei (TW);
Yung-Lung Liu, New Taipei (TW);
Chuan-Chieh Tseng, New Taipei (TW)

(73) Assignees: Lite-On Electronics (Guangzhou) Limited, Guangzhou (CN); Lite-On Technology Corporation, Taipei (TW)

( * ) Notice: Subject to any disclaimer, the term of this patent is extended or adjusted under 35 U.S.C. 154(b) by 84 days.

(21) Appl. No.: 13/172,920

(22) Filed: Jun. 30, 2011

(65) Prior Publication Data

US 2012/0212113 A1    Aug. 23, 2012

(30) Foreign Application Priority Data

Feb. 18, 2011    (CN) .................... 2011 2 0041034 U (51) Int. Cl.
| | | |
|---|---|---|
| *A47B 81/00* | (2006.01) | |
| *A47B 97/00* | (2006.01) | |
| *E05C 19/06* | (2006.01) | |
| *E05C 3/02* | (2006.01) | |

(52) U.S. Cl.
USPC ... 312/223.2; 292/80; 292/194; 292/DIG. 11; 292/DIG. 38

(58) Field of Classification Search
USPC ............. 312/223.2, 263, 319.1, 265.5, 265.6; 403/326, 329; 292/80, 81, 85, 87, 89, 292/194, 195, 229, 200, DIG. 11, DIG. 38
See application file for complete search history.

(56) References Cited

U.S. PATENT DOCUMENTS

| | | | | |
|---|---|---|---|---|
| 2,759,750 | A  * |  8/1956 | McConnell ................. | 292/336.3 |
| 3,797,870 | A  * |  3/1974 | Beckman ..................... | 70/84 |
| 3,951,444 | A  * |  4/1976 | Shull .............................. | 292/359 |
| 4,534,586 | A  * |  8/1985 | Smith ........................... | 292/228 |
| 4,856,829 | A  * |  8/1989 | Nakamura et al. ........... | 292/216 |
| 5,630,632 | A  * |  5/1997 | Swan ............................ | 292/240 |
| 6,502,871 | B1 * |  1/2003 | Malmanger .................. | 292/204 |
| 6,698,853 | B2 * |  3/2004 | Chen et al. ................... | 312/263 |
| 6,999,308 | B2 * |  2/2006 | Hsu .......................... | 361/679.33 |
| 7,066,504 | B2 * |  6/2006 | Perkins ......................... | 292/300 |
| 7,253,359 | B2 * |  8/2007 | Chen et al. ..................... | 174/50 |
| 7,758,133 | B2 * |  7/2010 | Chen et al. ................ | 312/223.2 |
| 2005/0023023 | A1 * |  2/2005 | Fan et al. ........................ | 174/66 |
| 2006/0273052 | A1 * | 12/2006 | Chen .............................. | 211/26 |
| 2007/0222347 | A1 * |  9/2007 | Chen et al. ................ | 312/223.2 |

* cited by examiner

*Primary Examiner* — Darnell Jayne
*Assistant Examiner* — Kimberley S Wright
(74) *Attorney, Agent, or Firm* — Li & Cai Intellectual Property (USA) Office (57) ABSTRACT

A fixing mechanism of housing includes a housing and a fixing assembly. The housing has a first wall and a second wall connected adjacently. The first wall has an assembling portion with an assembling hole projected thereon. The second wall has a buckling tab. The fixing assembly includes a knob and a locking piece. The knob has an operating portion, connected to a mounting arm, disposed on the assembling portion. The locking piece has a base disposed on the inner side of the assembling portion, a hooking arm extended from the base, and an elastic portion. The mounting arm penetrates through the assembling hole in securing to the base. The elastic portion is connected to the hooking arm and the first wall on respective ends. The free end of the hooking arm has a claw portion selectively engaged with the buckling tab of the second wall.

11 Claims, 7 Drawing Sheets

FIXING MECHANISM OF HOUSING AND FIXING ASSEMBLY THEREOF

BACKGROUND OF THE INVENTION

1. Field of the Invention

The present disclosure is related to a fixing mechanism for computer housing and a fixing assembly thereof, especially to a computer housing having a detachable side wall and a fixing assembly used to secure the side wall.

2. Description of Related Art

The conventional art to assemble the housing of a computer host usually uses screws to fix a side wall to the rear panel directly. Such assembling/disassembling technique is troublesome and time consuming.

Therefore, it is necessary to propose a fixing mechanism for a housing to overcome the above-mentioned problems, wherein the wall can be easily fixed or detached.

SUMMARY OF THE INVENTION

The present disclosure provides a fixing mechanism for a housing and a fixing assembly thereof, to reduce the number of engaging and fixing elements in reducing parts cost and labor time. Further, the present disclosure also simplifies the assembling and disassembling steps.

In order to achieve the above objectives, the present disclosure is to provide a fixing mechanism for a housing and a fixing assembly thereof. The fixing mechanism includes a housing and a fixing assembly. The housing includes a first wall and a second wall. The first wall has an assembling portion and an assembling hole formed through the assembling portion. The second wall is adjacent to the first wall, and has a buckling tab inwardly protruded therefrom and near the assembling portion. The fixing assembly includes a knob and a locking piece. The knob has an operating portion rotatably located at the outside of the assembling portion and a mounting arm connected to the operating portion. The mounting arm penetrates through the assembling hole. The locking piece has a base positioned on the inner side of the assembling portion, a hooking arm extended from the base, and an elastic portion, wherein the base is fixed to the mounting arm, wherein the elastic portion has one end connected to the hooking arm and the other end fixed to the first wall, wherein the hooking arm has a free end protruded with a claw portion, wherein the claw portion is selectively engaged with the buckling tab of the second wall.

According to one embodiment of the present disclosure, the fixing assembly further includes a washer, which is disposed between the knob and the locking piece. The washer is formed with a positioning opening. The assembling portion has a positioning blocker protruded outwardly. The positioning blocker is located in the positioning opening.

The present disclosure has advantages as follows. The fixing assembly has a small amount of elements, is easy to assemble, and could be made of plastic. The material cost is cheap and the weight is light. Further, the first wall of the housing (such as the side wall) can be easily and quickly installed and detached without screws. Only when detaching, the fixing assembly needs to be operated. When installing, the first wall (side wall) only needs to be pushed directly to assemble the housing.

For further understanding of the present disclosure, reference is made to the following detailed description illustrating the embodiments and examples of the present disclosure. The description is for illustrative purpose only and is not intended to limit the scope of the claim.

DETAILED DESCRIPTION OF THE PREFERRED EMBODIMENTS

In order to better understand the objective, structure, characteristics, and effects of the present disclosure, a description relating thereto will be made with reference to preferred embodiments thereof and the accompanying drawings.

Figure 1:
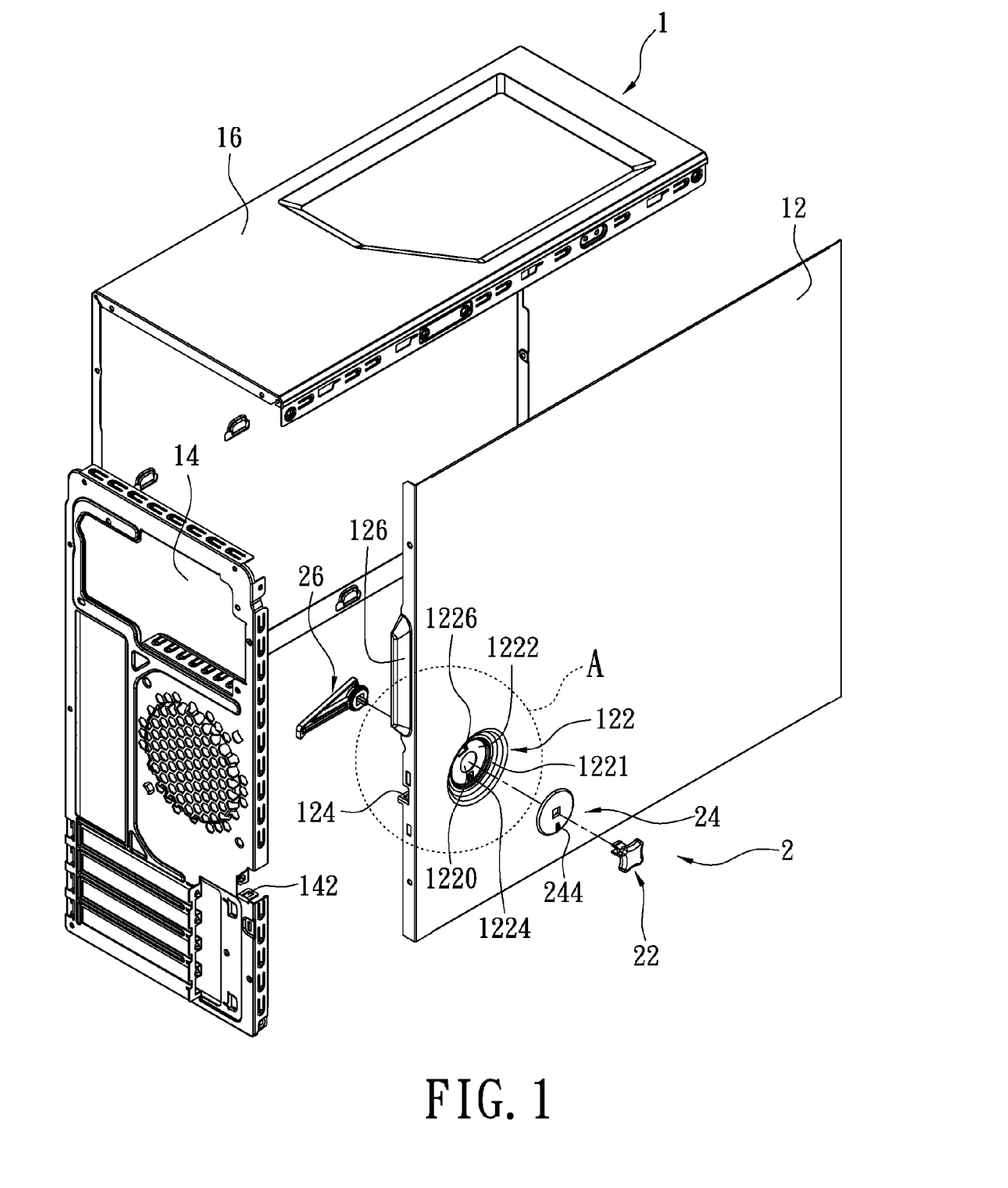
FIG. 1 is an exploded perspective view of a fixing mechanism for a housing according to the present disclosure.
Figure 2:
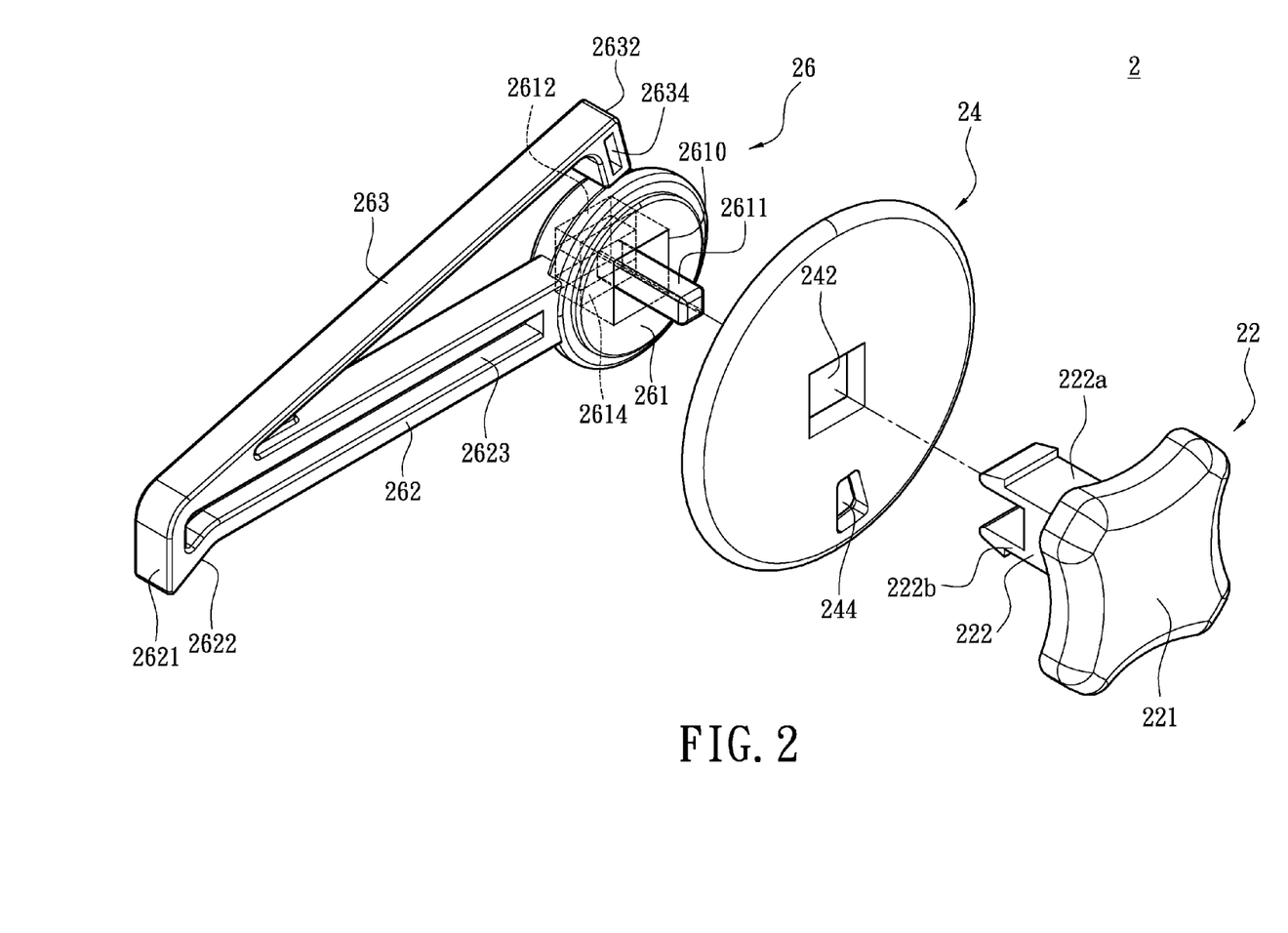
FIG. 2 is an exploded perspective view of a fixing assembly according to the present disclosure.

Reference is made to FIG. 1 and FIG. 2, which are exploded perspective views of a fixing mechanism for a housing according to the present disclosure. In the embodiment of FIG. 1, the housing is illustrated as a computer host housing 1. The housing 1 in FIG. 1 includes a side wall 12, a rear panel 14, and an L-shaped wall 16. When the present disclosure is applied to the housing 1 of the computer host, a fixing assembly 2 is provided on the side wall 12 for quickly detaching or installing the side wall 12. When the housing 1 is assembled completely, a rear edge of the side wall 12 is fixed to the rear panel 14 by the fixing assembly 2, and a top edge of the side wall 12 is engaged to the L-shaped wall 16.

However, the fixing assembly of the present disclosure also can be applied to other housings of different electronic devices. The fixing assembly 2 could be disposed on other wall member, such as a top wall, to fix the top wall to the side wall or the rear panel. In other words, the present disclosure can be selectively applied to either neighboring walls, namely a first wall and a second wall. In this embodiment, the side wall 12 can be deemed as one example of the first wall, and the rear panel 14 can be deemed as one example of the second wall. Therefore, it is known that the present disclosure can be applied to other housings of different electronic devices.

As shown in FIG. 1, the housing 1 includes a first wall 12 and a second wall 14. The fixing assembly 2 is mounted on the first wall 12. The first wall 12 has an assembling portion 122, and an assembling hole 1220 is formed through the assembling portion 122. The second wall 14 is adjacent to the first wall 12. The second wall 14 has a buckling tab 142 formed on one side thereof adjacent to the first wall 12, wherein the buckling tab 142 protrudes inwardly near the assembling portion 122. The buckling tab 142 of this embodiment could be formed by punching the second wall 14 and bent inwardly, which is substantially U-shaped.

Reference is made to FIG. 1 and FIG. 2, the fixing assembly 2 includes a knob 22 and a locking piece 26. The knob 22 and the locking piece 26 could be made of plastic for reducing cost and weight. The locking piece 26 is located at the inner side of the first wall 12 and has one end fixed to the knob 22 and another end which is a free end. The free end of the locking piece 26 is elastically engaged with the buckling tab 142 of the second wall 14, so that the first wall 12 is fixed to the second wall 14. The first wall 12 has a bearing tab 124 formed at rear edge of inner side thereof in corresponding to the buckling tab 142, for resting the free end of the locking piece 26. When the housing 1 is assembled completely, the bearing tab 124 of the first wall 12 is disposed on the buckling tab 142 of the second wall 14 in a stacked manner.

The knob 22 has an operating portion 221 which is rotatably disposed at outer side of the assembling portion 122 and a mounting arm 222 connected to the operating portion 221. In this embodiment, the operating portion 221 is substantially cross-shaped, star-shaped or dish-shaped, whose periphery is formed with concave portions for being held and rotated by the user. The mounting arm 222 has one end connected with the operating portion 221, and the other end extended outwardly to penetrate the assembling hole 1220 of the first wall 12.

The locking piece 26 has a base 261 located at the inner side of the assembling portion 122, a hooking arm 262 extended from the base 261, and an elastic portion 263. The base 261 is fixed to the knob 22 by the mounting arm 222 through the inner side of the first wall 12. The hooking arm 262 is parallel to the first wall 12 and from the base 261 extends toward the buckling tab 142 of the second wall 14. The free end of the hooking arm 262 is protruded with a claw portion 2621, which could be elastically engaged with the buckling tab 142 of the second wall 14. Thus, the first wall 12 and the second wall 14 could be jointed together. The claw portion 2621 further has a guiding inclined-surface 2622, which could help to lift the claw portion 2621 to engage the buckling tab 142 during the assembling process of the first wall 12 with the second wall 14. The hooking arm 262 could be formed with a slender groove 2623 at its central portion to enhance structural rigidity. The elastic portion 263 has one end connected to a top edge of the hooking arm 262, and diagonally extends toward the base 261 in parallel to the first wall 12. The other end (a distal end) of the elastic portion 263 is fixed to the first wall 12. In this embodiment, the other end of the elastic portion 263 is fixed to the assembling portion 122, for providing auxiliary elasticity to the hooking arm 262.

Preferably for the locking piece 26, the hooking arm 262 is integrally extended outwardly from the base 261, and the elastic portion 263 is integrally and diagonally extended from the free end of the hooking arm 262 toward the base 261. The other end of the elastic portion 263 is fixed to the inner side of the first wall 12. Such the integral structure does not need human labor to assemble, thus the quantity of elements is reduced. Alternatively, the elastic portion 263 can be a spring (not shown). One end of the spring is fixed to the free end of the hooking arm 262, and the other end is fixed to the inner side of the assembling portion 122 of the first wall 12, which functions the same as the above.

Reference is made to FIG. 2, the way of fixing the base 261 to the mounting arm 222 of the knob 22 is illustrated. In this embodiment, the mounting arm 222 of the knob 22 has a pair of clipping plates 222a and 222b. The clipping plates 222a and 222b are formed in a corresponding way and are barb-shaped at its front end. The base 261 has a sleeved hole 2610 formed facing the inner side of the first wall 12 and a pair of clamping slots 2612 and 2614 formed on a side portion thereof away from the knob 22. The pair of clamping slots 2612 and 2614 are communicated with the sleeved hole 2610. The pair of clipping plates 222a and 222b pass through the sleeved hole 2610 and penetrate through the pair of clamping slots 2612 and 2614 for engaging to the base 261.

To strengthen the engagement between the base 261 and the knob 22, especially torque-related, the base 261 further has a slipping shaft 2611 disposed in the sleeved hole 2610 extended toward the knob 22. The slipping shaft 2611 is located between the pair of clamping slots 2612 and 2614. In other words, the slipping shaft 2611 stretches into the mounting arm 222 between the pair of clipping plates 222a and 222b, to reinforce the engagement between the locking piece 26 with the knob 22. The slipping shaft 2611 is optional as a sub-element, which can be omitted per user.

Figure 2A:
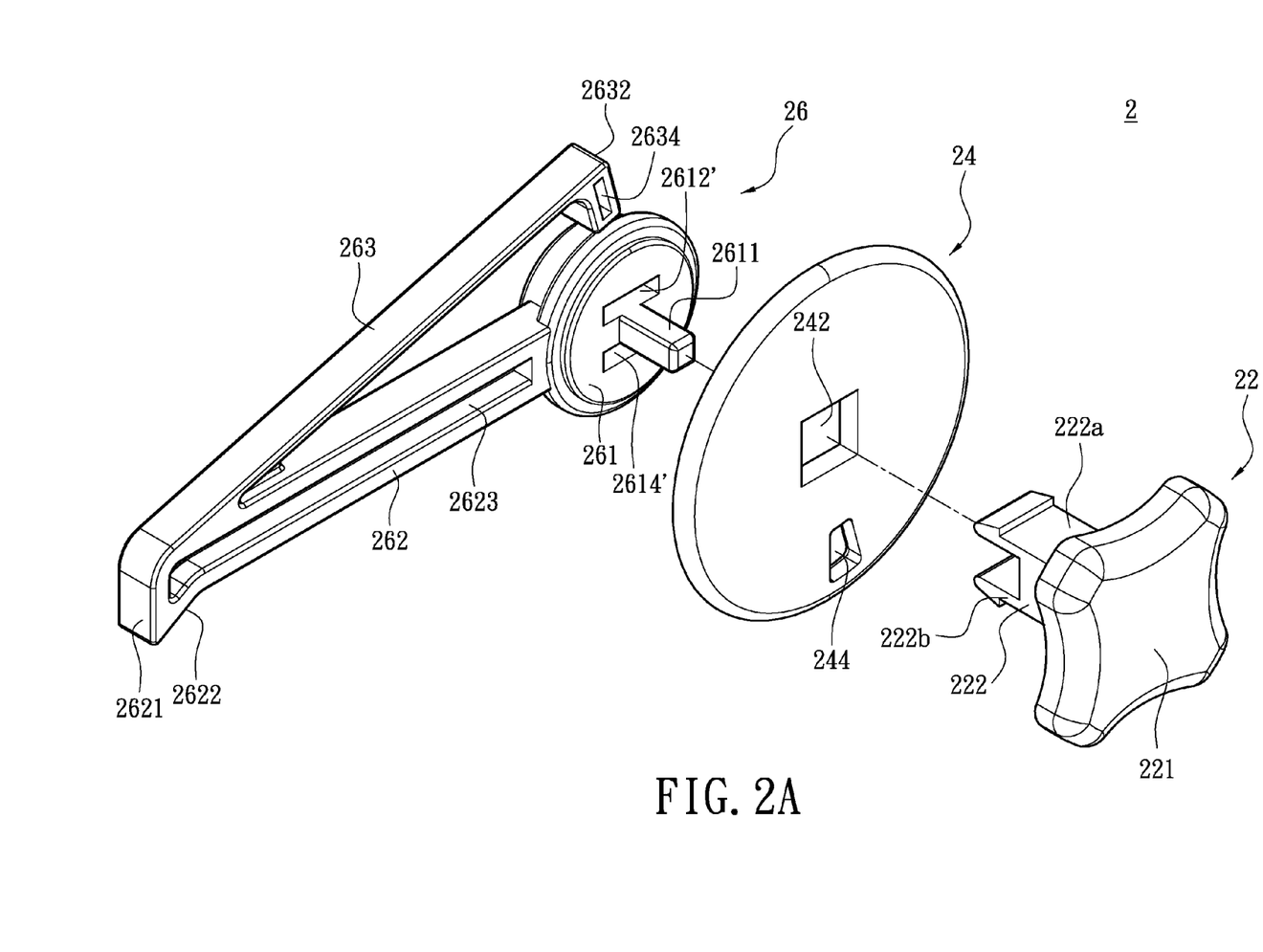
FIG. 2A is an exploded perspective view of a fixing assembly of another embodiment according to the present disclosure.

Please refer to FIG. 2A, which illustrates another embodiment according to the present disclosure, without the sleeved hole 2610. A pair of the clamping slots 2612' and 2614' is formed through the base 261 directly, and the clamping slots 2612' and 2614' can be wedged to receive the clipping plates 222a and 222b more smoothly. In this case, the slipping shaft 2611 is extended from the base 261 directly.

Please note that for the clipping plates 222a, 222b and the corresponding clamping slots 2612/2612', 2614/2614' illustrated above are not restricted in what disclosed in these embodiments, which are used to connect the base 261 to the knob 22. Their quantity and structure type can be adjusted and changed according to the requirements.

For example, the clipping plate could be at least one piece, and the base has at least one clamping slot formed correspondingly to the clipping plate. The clipping plate inserts into the clamping slot for fastening to the base.

Another example can have a plurality of clipping plates, such as four pieces arranged in a square shape, and the base has a plurality of clamping slots formed correspondingly to the clipping plates. Alternatively, one sleeved hole can be singly formed in the base, and the clipping plates are engaged to the base by passing through the sleeved hole. Further still, the base can be formed with a slipping shaft extended toward the assembling portion and a plurality of clamping slots corresponding to the clipping plates, wherein the clamping slots are arranged around the slipping shaft. The clipping plates are engaged to the base through the clamping slots, and the slipping shaft is projected among the clipping plates.

Figure 1A:
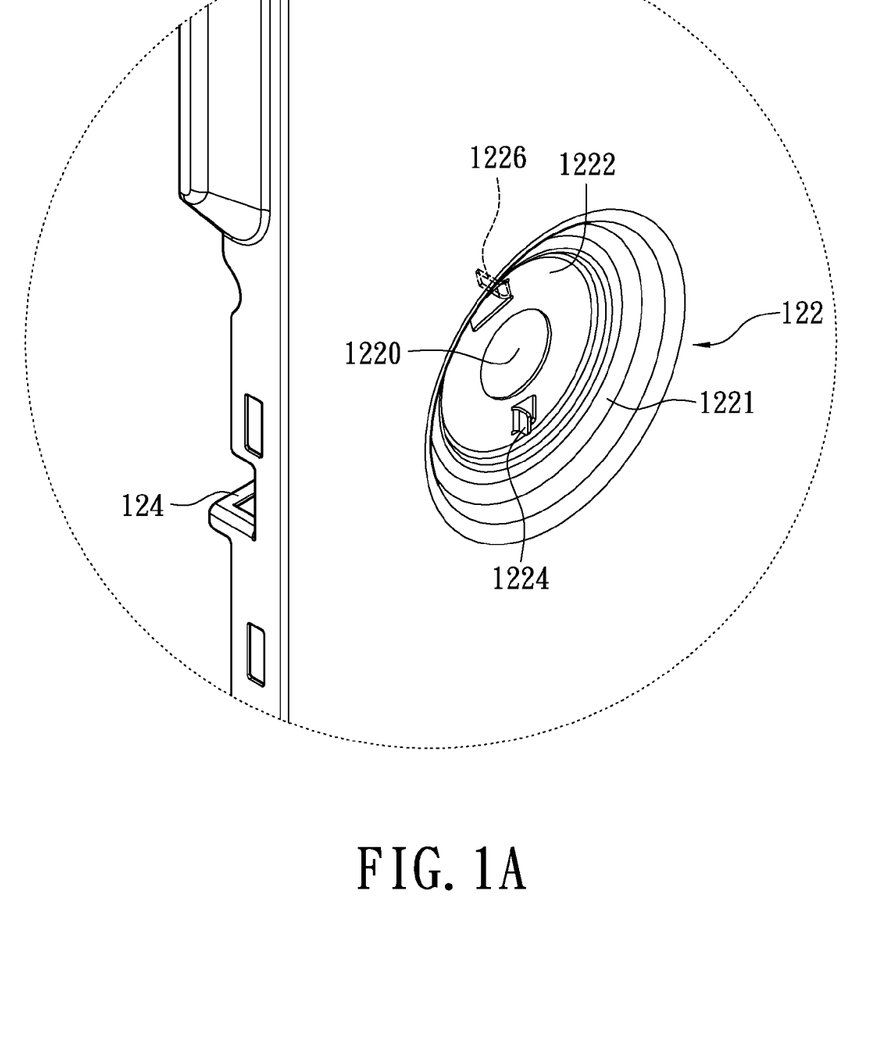
FIG. 1A is a partial enlarged view of portion A in FIG. 1.
Figure 4:
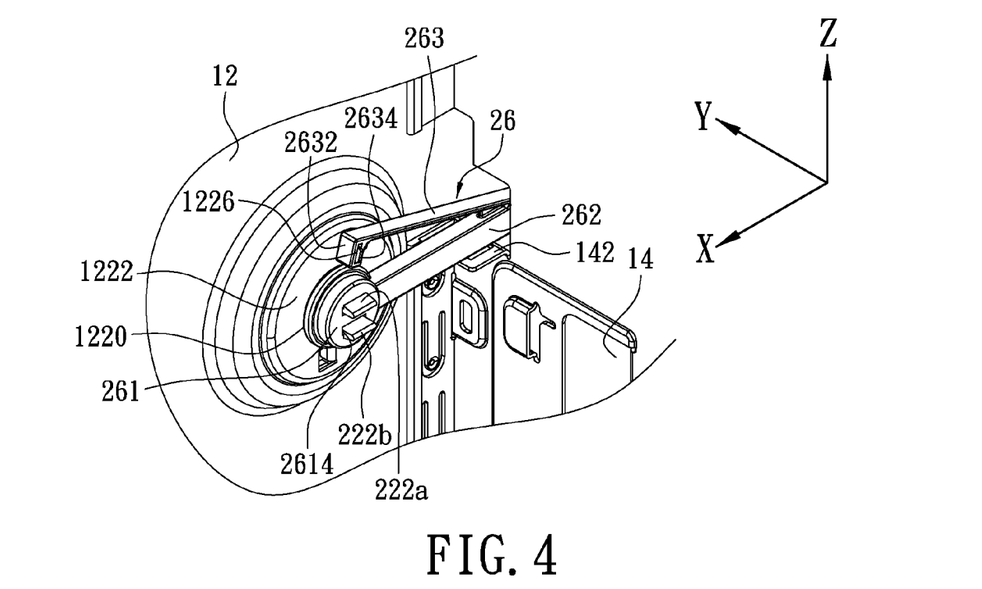
FIG. 4 is a partial perspective view of the fixing mechanism for the housing (unlocked) according to the present disclosure.

The housing 1 of this embodiment as shown in FIG. 1A is illustrated in an enlarged view. The assembling portion 122 is concaved inwardly to form a receiving depression 1221, which is used to receive the operating portion 221 of the knob 22, thus the knob 22 is not exposed beyond the outer surface of the first wall 12. It is to be noted that configuration of the assembling portion 122 is not limited to such. In this embodiment, the receiving depression 1221 has a planar-shaped flat surface 1222 at the bottom thereof, and the assembling hole 1220 is formed on the flat surface 1222. The mounting arm 222 of the knob 22 penetrates through the assembling hole 1220. Besides, the assembling portion 122 has a protrusive tab 1226 (as shown in FIG. 1A and FIG. 4) protruded toward the interior of the housing 1 to fix the distal end of the elastic portion 263. Refer to FIG. 1A, in this embodiment, the protrusive tab 1226 can be disposed on the inner surface of the flat surface 1222 toward the interior of the housing 1. A fixing end 2632, previously referred as the "other end or distal end" of the elastic portion 263, has a fastening element to fix at the inner side of the first wall 12. In this embodiment, the fastening element is substantially square-frame shaped and formed with a joint slot 2634, in which the protrusive tab 1226 is inserted fixedly.

Please note that, to fix the elastic portion 263 to the first wall 12, the quantity and structural type of the joint slot 2634 and the protrusive tab 1226 relative to this embodiment are not limited accordingly, which can be adjusted and altered according to the real requirement. For example, the fixing end of the elastic portion can have a protrusive tab extended toward the first wall, and the first wall is formed with a joint slot corresponding to the protrusive tab for receiving the protrusive tab therein.

This embodiment further includes a washer 24, which is located between the knob 22 and the locking piece 26, and rotatably disposed on the outer surface of the flat surface 1222 of the assembling portion 122. The washer 24 is formed with a central hole 242 at the central portion thereof corresponding to the assembling hole 1220. The mounting arm 222 of the knob 22 fixedly penetrates through the central hole 242 of the washer 24 and the assembling hole 1220 to connect with the locking piece 26 fixedly. The washer 24 has a smooth surface for reducing friction, which not only help the knob 22 to operate more smoothly but also protects the knob 22 from being damaged due to improper operation.

Please refer to FIG. 1 and FIG. 2, the washer 24 further has a positioning opening 244. The assembling portion 122 has a positioning blocker 1224 protruded outwardly and located in the positioning opening 244. Therefore, the degree of rotation of the washer 24 is limited by the positioning opening 244 of the washer 24. This design is used to prevent the knob 22 from being over-rotated while unlocking the fixing assembly 2 to disengage the first wall 12.

Figure 3:
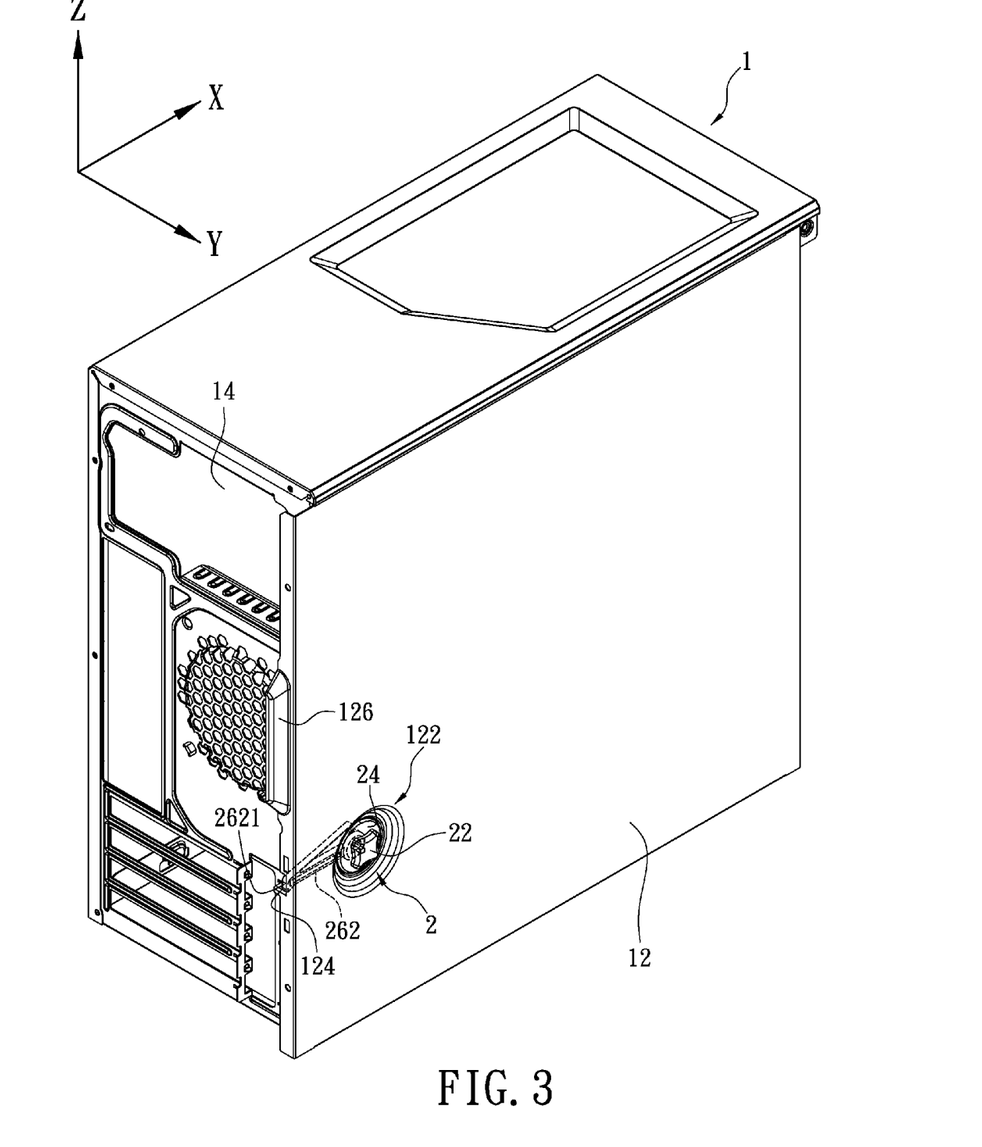
FIG. 3 is an assembled perspective view of the fixing mechanism for the housing (side wall is not locked yet) according to the present disclosure.

Please refer to FIG. 3, which is a perspective view of a fixing mechanism of computer housing (before securing the side wall), according to the present disclosure. Before securing the side wall, or the first wall 12, a rear edge of the first wall 12 is apart from the second wall 14 by a distance. This distance is reserved for the bearing tab 124 of the first wall 12 and the claw portion 2621. Approximately 5 to 15 centimeters wide, the actual distance is decided according to the size of the fixing assembly 2.

When the user is installing the first wall 12, the user just needs to hold a holding portion 126 formed at the rear edge of the first wall 12, and push the first wall 12 forwardly, that is toward the front panel of the housing 1 (along the positive direction of the X axis). Thus, the first wall 12, or the side wall, is automatically engaged to the second wall 14 by the fixing assembly 2. The detailed actions are described as follows.

Figure 5:
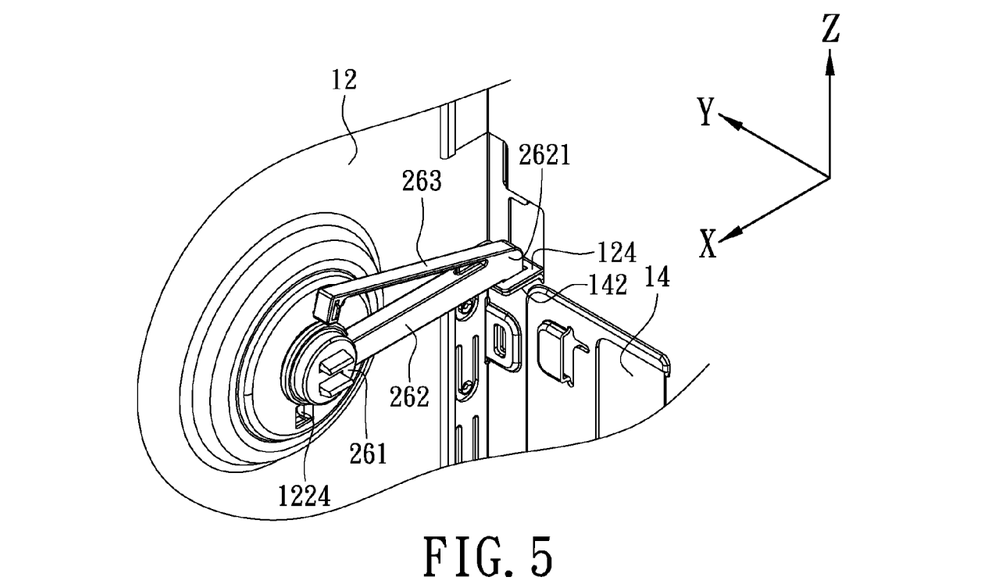
FIG. 5 is a partial perspective view of the fixing mechanism for the housing (locked) according to the present disclosure.

Reference is made to FIG. 4 and FIG. 5, which are partial perspective views of the fixing mechanism of computer housing before and after engagement according to the present disclosure. When pushing forward the first wall 12 (along positive direction of X axis) for installment, as shown in FIG. 4, the bearing tab 124 and the fixing assembly 2 moved toward the interior of the housing 1. Refer to FIG. 5, the bearing tab 124 of the first wall 12 is pushed onto the buckling tab 142 of the second wall 14. When the guiding inclined-surface 2622 at the bottom of the claw portion 2621 abuts the buckling tab 142, the claw portion 2621 is lifted accordingly. Since the locking piece 26 is elastic, the claw portion 2621 restores automatically and engages the buckling tab 142 immediately for joining the first wall 12 and the second wall 14. During the above process, the only action is to push the first wall 12, that is, the fixing assembly 2 does not need to be operated to secure the first wall 12 of the housing 1.

Figure 6:
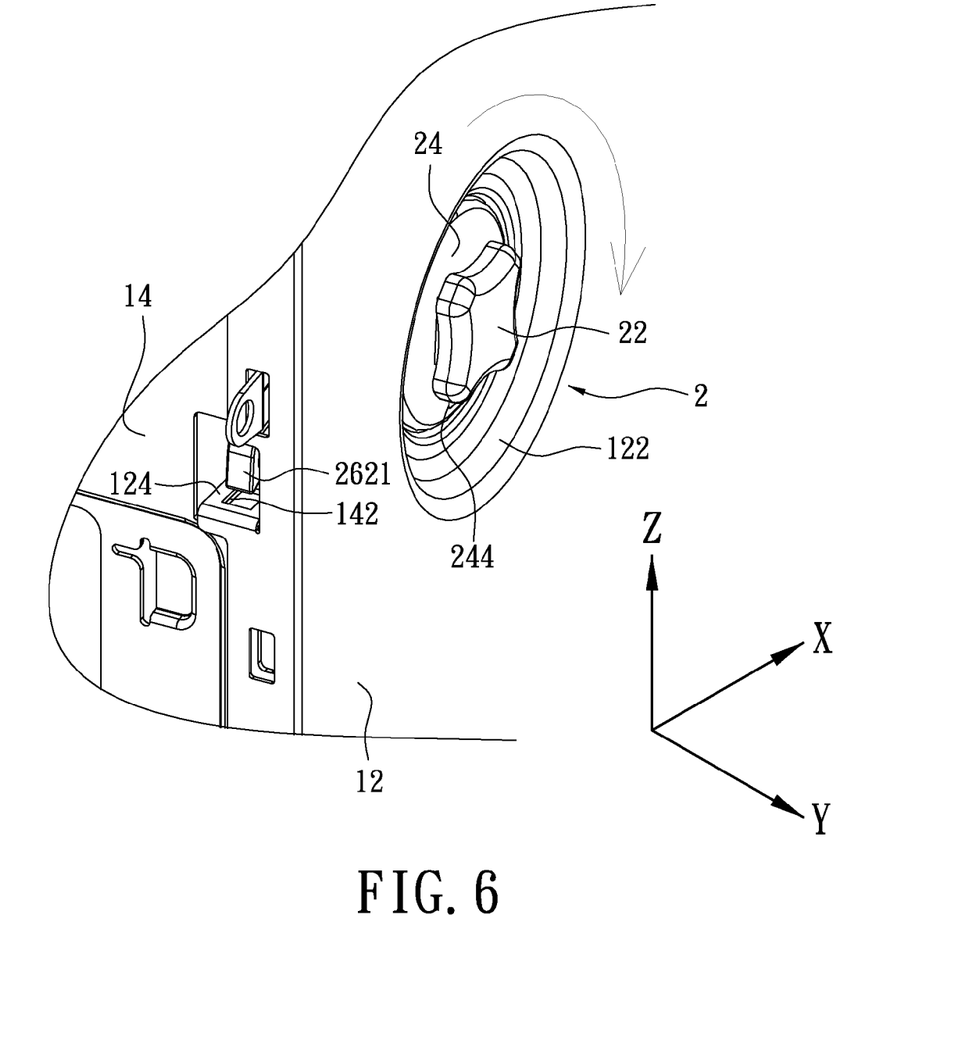
FIG. 6 is a perspective view of the fixing mechanism for the housing being disengaged according to the present disclosure.

Please refer to FIG. 6. To detach the first wall 12, the user only needs to rotate the knob 22 in clockwise direction and the locking piece 26 is rotated accordingly. Then, the claw portion 2621 is released from the bearing tab 124 and the buckling tab 142. After the first wall 12 is disengaged, the user can hold the holding portion 126 to move backward and away from the second wall 14. The knob 22 only needs to be rotated slightly, wherein 5 to 10 angular degrees would suffice. In this embodiment, the washer 24 rotates with the knob 22, and since the positioning blocker 1224 within the positioning opening 244 prevents over-rotation, the fixing assembly 2 is protected from being damaged due to excessive turning force.

Please refer to FIG. 5. When the knob 22 is rotated, the elastic portion 263 is deformed accordingly and then the claw portion 2621 is released from the bearing tab 124 and the buckling tab 142. When the first wall 12 is dismounted and the knob 22 is released, the deformed elastic portion 263 provides the restoring force for the locking piece 26 and the hooking arm 262 thereof to make the claw portion 2621 returns to the bearing tab 124.

In summary, the present disclosure has at least the following advantages. The side wall (first wall) of the housing can be easily and quickly installed or dismounted without screws. Only during dismounting, the fixing assembly needs to be operated. During installing, the only action is to push the side wall (first wall). The fixing assembly has a small amount of elements, is easy to assemble, saves time, and can be made of plastic to reduce material cost and weight. Further, the washer allows the knob to be operated smoothly, and protects the knob from being damaged due to improper operation.

The description above only illustrates specific embodiments and examples of the present disclosure. The present disclosure should therefore cover various modifications and variations made to the herein-described structure and operations of the present disclosure, provided they fall within the scope of the present disclosure as defined in the following appended claims.

What is claimed is:

1. A fixing mechanism, comprising:
   a housing, including
      a first wall having an assembling portion and an assembling hole formed through the assembling portion; and
      a second wall adjacent to the first wall, wherein a buckling tab is inwardly protruded from the second wall and near the assembling portion; and
   a fixing assembly, including
      a knob having an operating portion rotatably installed in the assembling portion and a mounting arm extended from the operating portion, the mounting arm rotatably penetrated through the assembling hole, wherein the knob is rotated about the mounting arm; and
      a locking piece having a base disposed on the opposite side surface of the assembling portion with respect to the knob, a substantial rigid hooking arm integrally formed with the base and extended from the base, and an elastic portion integrally formed with the hooking arm and extended from the distal end of the hooking arm toward the base, the mounting arm being secured to the base, wherein the elastic portion has a distal end fixed on the first wall, wherein the distal end of the hooking arm is formed with a claw portion selectively engaged to the buckling tab of the second wall;
   wherein the base, the hooking arm and the elastic portion are integrally formed as a one-piece;
   wherein the assembling portion has a protrusive tab protruded toward the locking piece for securing the distal end of the elastic portion;
   wherein the distal end of the elastic portion is formed with a fastening element and wherein the protrusive tab is inserted into the fastening element to secure the distal end of the elastic portion onto the inner side of the first wall.

2. The fixing mechanism of claim 1, wherein the assembling portion is inwardly concaved in forming a receiving depression having a flat surface at a bottom thereof to receive the operating portion of the knob, and wherein the assembling hole is formed on the flat surface.

3. The fixing mechanism of claim 1 wherein a joint slot is formed in the fastening element, and the joint slot is substantially orthogonal to the elastic portion.

4. The fixing mechanism of claim 2, further comprising a washer having a hole formed thereon, the washer being rotatably disposed on the flat surface of the assembling portion, wherein the mounting arm of the knob fixedly passes through the washer and the assembling hole and is connected with the locking piece fixedly.

5. The fixing mechanism of claim 4, wherein the washer is formed with a positioning opening, wherein the assembling portion has a positioning blocker protruded outwardly thereof, and wherein the positioning blocker is located in the positioning opening, wherein the degree of rotation of the knob is limited by the positioning opening of the washer.

6. The fixing mechanism of claim 1, wherein the mounting arm of the knob has at least one clipping plate, wherein the base is formed with at least one clamping slot corresponding to the clipping plate, and wherein the clipping plate is inserted into the clamping slot to secure with the base.

7. The fixing mechanism of claim 1, wherein the mounting arm of the knob has a plurality of clipping plates, wherein the base has a slipping shaft extended toward the assembling portion and a plurality of clamping slots corresponding to the clipping plates, wherein the slipping shaft is surrounded by the clamping slots, wherein the clipping plates pass through the clamping slots to secure with the base, and wherein the slipping shaft is located among the clipping plates.

8. The fixing mechanism of claim 1, wherein the mounting arm of the knob has a plurality of clipping plates, wherein the base is formed with a sleeved hole, and wherein the clipping plates pass through the sleeved hole to secure with the base.

9. The fixing mechanism of claim 8, wherein the base has a slipping shaft formed in the sleeved hole, wherein the base has a plurality of clamping slots formed at the side away from the knob corresponding to the clipping plates, wherein the clamping slots are communicated with the sleeved hole, wherein the slipping shaft is disposed among the clamping slots, wherein the clipping plates pass through the clamping slots to secure with the base, and wherein the slipping shaft is located among the clipping plates.

10. The fixing mechanism of claim 1, wherein the claw portion of the hooking arm has a guiding inclined-surface formed at a bottom surface thereof.

11. The fixing mechanism of claim 1, wherein the first wall further has a bearing tab to support the claw portion of the hooking arm.

* * * * *